(12) United States Patent
Gaebler

(10) Patent No.: US 8,251,371 B2
(45) Date of Patent: Aug. 28, 2012

(54) SEGMENTED SEALING LIPS FOR LABYRINTH SEALING RINGS

(75) Inventor: Miklos Gaebler, Potsdam (DE)

(73) Assignee: Rolls-Royce Deutschland Ltd Co KG (DE)

( * ) Notice: Subject to any disclaimer, the term of this patent is extended or adjusted under 35 U.S.C. 154(b) by 229 days.

(21) Appl. No.: 12/629,493

(22) Filed: Dec. 2, 2009

(65) Prior Publication Data

US 2010/0148449 A1 Jun. 17, 2010

(30) Foreign Application Priority Data

Dec. 11, 2008 (DE) .......................... 10 2008 061 800

(51) Int. Cl.
*F16J 15/447* (2006.01)
(52) U.S. Cl. ......... 277/412; 277/416; 277/418; 415/230
(58) Field of Classification Search .................. 277/412, 277/416, 418–420; 415/173.7, 174.5, 174.4, 415/230
See application file for complete search history.

(56) References Cited

U.S. PATENT DOCUMENTS

| | | | |
|---|---|---|---|
| 4,157,232 A * | 6/1979 | Bobo et al. .................... | 415/116 |
| 5,290,144 A | 3/1994 | Kreitmeier | |
| 5,568,931 A * | 10/1996 | Tseng et al. .................. | 277/355 |
| 5,756,217 A | 5/1998 | Schroeder et al. | |
| 6,471,216 B1 * | 10/2002 | Brainch et al. ................ | 277/418 |
| 6,478,304 B1 * | 11/2002 | Hoffelner ...................... | 277/415 |
| 6,805,530 B1 | 10/2004 | Urban | |
| 6,939,104 B2 | 9/2005 | Chantal | |
| 7,326,033 B2 | 2/2008 | Boegli et al. | |
| 7,744,093 B2 * | 6/2010 | McMillan ...................... | 277/355 |
| 2004/0012151 A1 * | 1/2004 | Beeck et al. ................... | 277/415 |
| 2007/0040335 A1 * | 2/2007 | Kowalczyk ................... | 277/412 |
| 2007/0110562 A1 | 5/2007 | Mons et al. | |

FOREIGN PATENT DOCUMENTS

| | | |
|---|---|---|
| DE | 4432998 | 4/1996 |
| DE | 102004025321 | 12/2005 |
| DE | 60203214 | 3/2006 |
| DE | 112004000657 | 2/2007 |
| EP | 1785651 | 5/2007 |
| GB | 2451568 | 2/2009 |

OTHER PUBLICATIONS

German Search Report dated Aug. 4, 2009 from counterpart German application.

* cited by examiner

*Primary Examiner* — Vishal Patel
(74) *Attorney, Agent, or Firm* — Timothy J. Klima; Shuttleworth & Ingersoll, PLC

(57) ABSTRACT

A labyrinth sealing ring for a labyrinth seal of a turbine disk 1 of a gas turbine includes a metallic annular element 3 with at least one annular sealing lip 4. The sealing lip 4 is provided with at least one groove 5 on its circumference which is essentially arranged in the radial direction.

9 Claims, 1 Drawing Sheet

SEGMENTED SEALING LIPS FOR LABYRINTH SEALING RINGS

Figure 1:
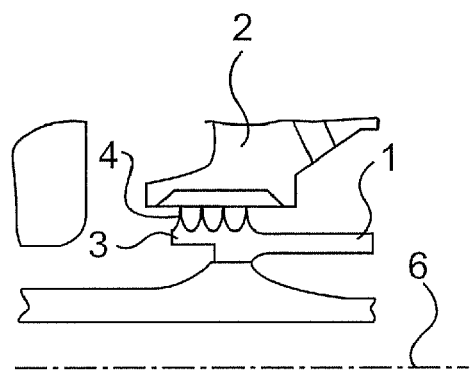

This application claims priority to German Patent Application DE102008061800.4 filed Dec. 11, 2008, the entirety of which is incorporated by reference herein.

This invention relates to a labyrinth sealing ring.

More particularly, the present invention relates to a crack-resistant sealing lip of a labyrinth sealing ring for use with a labyrinth seal of a turbine disk of a gas turbine, in particular a high-pressure gas turbine.

It is known from the state of the art to use metal for the fabrication of such sealing rings. They feature at least one annular sealing lip mating with small clearance with a component moving relatively to the sealing ring.

Sealing lips on rotating components are designed with small clearance tolerances between the static and the rotary members. This provides for good sealing properties without larger leakage rates.

In practice, however, it frequently happens, for example in normal engine operation during engine start-up and shutdown, that the sealing lip of the labyrinth sealing ring at least temporarily contacts the associated component, for example a static part of a stator disk. This initially results in local heating of the sealing lip. As a result, material stresses will occur which in turn may cause crack formation and crack propagation.

In particular on high-pressure turbine disks, this incurs increased failure risk. Consequently, it may be necessary to replace the entire turbine disk. This demands considerable financial effort, especially at engine overhaul.

In a broad aspect, the present invention provides a labyrinth sealing ring of the type specified above, which avoids the disadvantages of the state of the art, has a long service life and features low susceptibility to crack formation, while being simply designed and easily and cost-effectively manufacturable.

According to the present invention it has therefore been provided that at least one groove extending essentially in the radial direction is arranged on the circumference of the sealing lip.

The provision of a groove, which in a preferred embodiment features a very small width, for example between 50 µm and 300 µm, reduces thermal stresses caused by the sealing lip being heated when contacting the associated component moving relatively to it.

According to the present invention, the sealing ring can be stationary or rotary, with the invention not being limited to a labyrinth sealing ring attached to a turbine disk.

By allowing the sealing lip to thermally expand in the circumferential direction, the hazard of crack formation is substantially reduced. In a particularly favorable development, the present invention provides for several, circumferentially arranged grooves or slots. The grooves or slots are producible by micromachining.

It is further advantageous if the bottom area of the groove is provided with a rounding. Thus, crack propagation originating from the very narrow groove is prevented. The rounding can, for example, be in the form of a microhole precluding crack initiation.

According to the present invention, uncontrolled cracking due to thermal stresses is thus avoided. Since cracking in the sealing lip can in practice propagate not only through the sealing ring but also through the turbine disk, the life of the latter is directly increased. Thus, the scrap rate of turbine disks is also considerably reduced, resulting in lower spare parts and overhaul costs for the entire engine. Further advantageously, repair or restoration of damaged sealing lips at engine overhaul is no longer required.

The present invention is further advantageous in that coating of the sealing lips can be dispensed with. This also reduces manufacturing costs.

The generally reduced risk of crack formation also lowers the risk of non-detectable cracks overlooked during inspection in the framework of engine overhaul.

The present invention is more fully described in light of the accompanying drawings showing a preferred embodiment. In the drawings, FIG. 1 is a schematic lateral view of a sealing arrangement in accordance with the state of the art, FIG. 2 is a further view, similarly to FIG. 1, of a sealing arrangement known from the state of the art, and FIG. 3 is a perspective partial view of a labyrinth sealing ring in accordance with the present invention.

Figure 2:
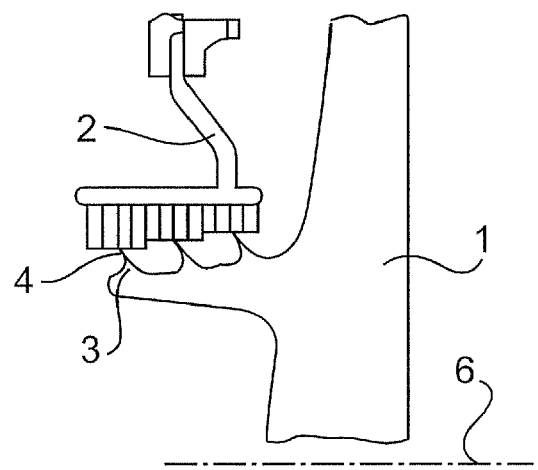

According to the present invention, it has been provided that on a turbine disk 1 an annular element 3 is arranged which has at least one sealing lip 4 interacting and forming a labyrinth seal with a stator element 2, as shown in FIGS. 1 and 2. Rotation or relative movement between the stator element 2 and the sealing lip 4 is around an axis 6, which is only schematically shown.

Figure 3:
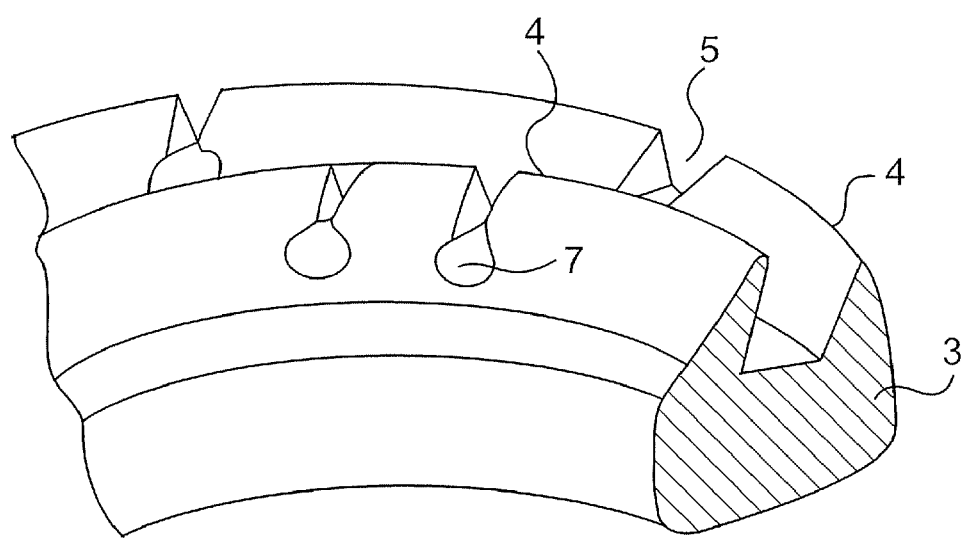

FIG. 3 shows, in schematic perspective partial view, an annular element 3 of a labyrinth sealing ring provided with two sealing lips 4 according to the present invention.

Circumferentially distributed, grooves 5 are provided on each of the sealing lips 4. For a better representation, the grooves 5 are shown extremely broad in FIG. 3. In reality, these are microslots which, for example, are between 50 µm and 300 µm wide (circumferentially).

The height of the grooves 5 essentially amounts to the full radial height of the sealing lip 4. In the bottom area 7, a rounding or borehole is provided to preclude crack propagation in the base material of the annular element 3 and thus in the turbine disk 1.

FIG. 3 already shows various variants of the distribution of the grooves 5 on the circumference of the sealing lip 4. These can be evenly distributed on the circumference, but it is also possible to form individual groups or provide other distributions.

According to the present invention, the grooves 5 can be arranged parallel to the machine axis 6, i.e. in a plane including the machine axis 6. However, the grooves can also be inclined relatively to this plane, and thus be obliquely arranged, to thereby reduce the airflow through the seal by increasing the pressure ratio, thus requiring less bleed air and consequently increasing engine performance.

The arrangement of the grooves on the circumference of the sealing lip and their height may be uniform or different. Furthermore, in accordance with the present invention, different cross-sectional shapes of the sealing lips 4 are providable in line with the respective application.

LIST OF REFERENCE NUMERALS

1 Turbine disk
2 Stator element
3 Annular element
4 Sealing lip
5 Groove
6 Axis/machine axis/central axis
7 Bottom area

What is claimed is:

1. A labyrinth seal having a stator and a rotor for a gas turbine, comprising:

a metal ring having a metallic annular element arranged on the rotor about a central axis of the gas turbine and having a plurality of annular sealing lips, each annular sealing lip having a first circumferential face, a second circumferential face and a sealing edge positioned between the first and second circumferential faces, the sealing edge sealing against the stator of the gas turbine, wherein each sealing lip includes at least one groove on its circumference which is arranged in a radial direction with respect to the central axis of the gas turbine;

the groove being a slot extending between the first circumferential face and the second circumferential face, and being open between the first circumferential face and the second circumferential face and to the sealing edge;

the groove being arranged parallel to a central axis of the sealing ring;

an area of the groove opposite the portion open to the sealing edge being rounded;

wherein the groove extends over a full height of the sealing lip.

2. The sealing ring of claim 1, wherein the groove has a width between 50 μm and 300 μm in a circumferential direction.

3. The sealing ring of claim 2, wherein the rounded portion is formed as a borehole.

4. The sealing ring of claim 1, wherein the groove has a width between 50 μm and 300 μm in a circumferential direction.

5. The sealing ring of claim 1, wherein the rounded portion is formed as a borehole.

6. The sealing ring of claim 1, wherein the at least one groove is a plurality of grooves distributed evenly around the circumference.

7. The sealing ring of claim 1, wherein the at least one groove is a plurality of grooves distributed unevenly around the circumference.

8. The sealing ring of claim 1, wherein the at least one groove is a plurality of grooves with at least two of the grooves having different heights.

9. The sealing ring of claim 1, wherein the at least one groove is a plurality of grooves having a same height.

* * * * *